(12) United States Patent
Iyer et al.

(10) Patent No.: US 11,200,539 B2
(45) Date of Patent: Dec. 14, 2021

(54) AUTOMATIC COMPLETION OF ROBOTIC PROCESS AUTOMATION WORKFLOWS USING MACHINE LEARNING

(71) Applicant: UiPath, Inc., New York, NY (US)

(72) Inventors: Kartik Iyer, Karnataka (IN);
Radhakrishnan Iyer, Karnataka (IN);
Naveen Kumar M, Karnataka (IN)

(73) Assignee: UiPath, Inc., New York, NY (US)

( * ) Notice: Subject to any disclaimer, the term of this patent is extended or adjusted under 35 U.S.C. 154(b) by 18 days.

(21) Appl. No.: 16/702,966

(22) Filed: Dec. 4, 2019

(65) Prior Publication Data

US 2021/0110345 A1    Apr. 15, 2021

(30) Foreign Application Priority Data

Oct. 15, 2019 (IN) .............................. 201911041766

(51) Int. Cl.
*G06Q 10/10* (2012.01)
*G06N 20/00* (2019.01)
*G06Q 10/06* (2012.01)

(52) U.S. Cl.
CPC ............. *G06Q 10/10* (2013.01); *G06N 20/00* (2019.01); *G06Q 10/0633* (2013.01); *G06Q 10/06316* (2013.01)

(58) Field of Classification Search
CPC ......... G06Q 10/0633; G06Q 10/06316; G06Q 10/103; G06Q 10/067; G06N 3/08; G06N 20/00
See application file for complete search history.

(56) References Cited

U.S. PATENT DOCUMENTS 5,172,313 A * 12/1992 Schumacher ...... G06Q 10/0633
705/7.27
7,356,583 B2 * 4/2008 Palmer .................. G06Q 10/10
709/224

(Continued)

OTHER PUBLICATIONS

Gao, Junxiong et al., Automated Robotic Process Automation: A Self-Learning Approach Part of the Lecture Notes in Computer Science book series (LNCS, vol. 11877), Oct. 11, 2019 (Year: 2019).*

(Continued)

*Primary Examiner* — Scott L Jarrett
(74) *Attorney, Agent, or Firm* — LeonardPatel PC; Michael A. Leonard, II; Sheetal S. Patel

(57) ABSTRACT

Automatic completion of robotic process automation (RPA) workflows using machine learning (ML) is disclosed. A trained ML model may intelligently and automatically predict and complete the next series of activities in RPA workflows (e.g., one, a few, many, the remainder of the workflow, etc.). Actions users take while creating workflows over a time period may be captured and stored. The ML model may then be trained and used to match the stored actions with stored workflow sequences of actions in order to predict and complete the workflow. As more and more workflow sequences are captured and stored over time, the ML model may be retrained to predict a larger number of sequences and/or to more accurately make predictions. Auto-completion may occur in real-time in some embodiments to save time and effort by the user.

33 Claims, 11 Drawing Sheets

(56) References Cited

U.S. PATENT DOCUMENTS

| | | | |
|---|---|---|---|
| 8,266,585 B2* | 9/2012 | Funt | G06F 8/33 717/109 |
| 8,321,251 B2* | 11/2012 | Opalach | G06Q 10/06 705/7.11 |
| 8,448,089 B2* | 5/2013 | Li | G06F 3/0484 715/816 |
| 8,639,555 B1* | 1/2014 | Johnston | G06Q 10/0633 705/7.27 |
| 8,904,355 B2 | 12/2014 | Channamsetti et al. | |
| 9,063,764 B2* | 6/2015 | Gardner | G06F 9/45508 |
| 9,116,672 B2* | 8/2015 | Muir | G06F 8/33 |
| 9,436,507 B2 | 9/2016 | Mishra et al. | |
| 9,811,352 B1* | 11/2017 | Sharifi | G06F 16/156 |
| 9,817,967 B1 | 11/2017 | Shukla et al. | |
| 10,339,027 B2* | 7/2019 | Garcia | G06F 11/3409 |
| 10,365,799 B2 | 7/2019 | Hosbettu et al. | |
| 10,466,863 B1* | 11/2019 | Guy | G06F 3/04845 |
| 10,476,971 B2* | 11/2019 | Holmes-Higgin | G06Q 10/103 |
| 10,607,165 B2* | 3/2020 | Punera | G06Q 10/06311 |
| 10,678,874 B2* | 6/2020 | Mukherjee | H04L 67/10 |
| 10,812,627 B2* | 10/2020 | Berg | G06F 11/3452 |
| 2004/0243977 A1* | 12/2004 | Shou | G06F 8/33 717/112 |
| 2004/0260591 A1* | 12/2004 | King | G06Q 10/10 705/7.28 |
| 2005/0066304 A1* | 3/2005 | Tattrie | G06F 8/30 717/101 |
| 2005/0234698 A1 | 10/2005 | Pinto et al. | |
| 2006/0074730 A1* | 4/2006 | Shukla | G06Q 10/0633 705/7.27 |
| 2006/0136490 A1 | 6/2006 | Aggarwal et al. | |
| 2007/0276714 A1* | 11/2007 | Beringer | G06Q 10/10 705/7.12 |
| 2009/0199123 A1* | 8/2009 | Albertson | G06F 3/04845 715/772 |
| 2010/0083225 A1* | 4/2010 | Giat | G06F 8/33 717/111 |
| 2010/0269032 A1* | 10/2010 | King | G06F 40/274 715/234 |
| 2011/0078426 A1* | 3/2011 | Stoitsev | G06Q 10/04 712/244 |
| 2012/0323827 A1* | 12/2012 | Lakshmanan | G06N 5/003 706/12 |
| 2013/0073994 A1* | 3/2013 | Liao | G06F 9/44 715/762 |
| 2013/0152038 A1* | 6/2013 | Lim | G06Q 10/103 717/101 |
| 2013/0179208 A1* | 7/2013 | Chung | G06Q 10/06 705/7.15 |
| 2014/0310053 A1* | 10/2014 | Liu | G06Q 10/0633 705/7.27 |
| 2014/0350994 A1* | 11/2014 | Lakshmanan | G06Q 10/06316 705/7.26 |
| 2016/0062745 A1* | 3/2016 | Rao | G06F 8/33 717/109 |
| 2016/0188298 A1* | 6/2016 | Vandikas | G06F 8/20 717/105 |
| 2017/0039040 A1* | 2/2017 | Nayak | G06Q 10/00 |
| 2017/0109636 A1* | 4/2017 | Marcu | G06F 11/368 |
| 2017/0109639 A1* | 4/2017 | Marcu | G06F 8/30 |
| 2017/0109640 A1* | 4/2017 | Marcu | G06F 11/368 |
| 2017/0109676 A1* | 4/2017 | Marcu | G06F 11/3672 |
| 2018/0046956 A1* | 2/2018 | Marcu | G06Q 10/0633 |
| 2018/0241881 A1* | 8/2018 | Li | H04M 3/5183 |
| 2018/0294059 A1* | 10/2018 | Savant | G16H 20/00 |
| 2019/0155225 A1 | 5/2019 | Kothandaraman et al. | |
| 2019/0205792 A1 | 7/2019 | Huang | |
| 2019/0220331 A1* | 7/2019 | Duggal | G06F 9/542 |
| 2019/0317803 A1* | 10/2019 | Maheshwari | G06Q 10/06 |
| 2019/0324781 A1* | 10/2019 | Ramamurthy | G06N 3/088 |
| 2021/0042338 A1* | 2/2021 | Smutko | G06F 16/3344 |
| 2021/0103798 A1* | 4/2021 | Neagovici | G06K 9/6257 |

OTHER PUBLICATIONS

Automation Anywhere Enterprise Development Client User Guide Automation Anywhere, Jun. 28, 2017 (Year: 2017).*

Svyatkovskiy, Alexey et al., Pythia: Al-assisted Code Completion System KDD'19, ACM, Aug. 2019 (Year: 2019).*

Bruch, Marcel et al., Learning from Examples to Improve Code Completion System Proceedings of the 7th join meeting of the European Software Engineer Conference and the ACM Symposium on the Foundations of Software Engineering, 2009 (Year: 2009).*

Luo, Chu, A Report on Automatic Code Completion Nanyang Technological University, Mar. 2017 (Year: 2017).*

AI—the new black? The final frontier of productivity UiPath, 2017 (Year: 2017).*

SAP Process Mining by celonis 4.2—manual Celnois SE, 2017 (Year: 2017).*

"Autocompletion with deep learning," TabNine web article available at https://tabnine.com/blog/deep/ (Jul. 15, 2019).

International Search Report and Written Opinion of the International Search Authority issued in PCT Application No. PCT/US2020/048512 dated Dec. 10, 2020.

Confidence Intervals for Machine Learning available at https://machinelearningmastery.com/confidence-intervals-for-machine-learning/ (Aug. 8, 2019).

Boogie Classification Thresholding Crash Course available at https://web.archive.org/web/20190523163343/https://developers.google.com/machine-learning/crash-course/classification/thresholding (May 23, 2019).

PyTorch Beginners Tutorial for Training a Classifier available at https://web.archive.org/web/20170328045030/https://pytorch.org/tutorials/beginner/blitz/cifar10_tutorial.html (Mar. 28, 2017).

Visualizing Machine Learning Thresholds to Make Better Business Decisions available at https://blog.insightdatascience.com/visualizing-machine-learning-thresholds-to-make-better-business-decisions-4ab07f823415 (Oct. 9, 2015).

* cited by examiner

AUTOMATIC COMPLETION OF ROBOTIC PROCESS AUTOMATION WORKFLOWS USING MACHINE LEARNING

CROSS REFERENCE TO RELATED APPLICATION

This application claims the benefit of Indian Provisional Patent Application No. 201911041766 filed Oct. 15, 2019. The subject matter of this earlier filed application is hereby incorporated by reference in its entirety.

FIELD

The present invention generally relates to robotic process automation (RPA), and more specifically, to automatic completion of RPA workflows using machine learning (ML).

BACKGROUND

An RPA workflow may include many modules and/or sequences. When creating workflows for similar tasks, users often tend to repeat certain steps or sequences. Repeating these steps in the workflow takes more developer time and reduces productivity. Existing solutions provide template-driven generation of workflow designs for business automation. However, these templates are preset and do not include intelligence in predicting the user intent or requirements, let alone take into account changes therein. Accordingly, an improved solution that reduces or avoids such repetition during workflow creation may be beneficial.

SUMMARY

Certain embodiments of the present invention may provide solutions to the problems and needs in the art that have not yet been fully identified, appreciated, or solved by current RPA technologies. For example, some embodiments of the present invention pertain to automatic completion of RPA workflows using ML.

In an embodiment, a system includes a plurality of developer computing systems including respective designer applications and a database storing workflows. The workflows include sequences of activities. The system also includes a server configured to train one or more ML models. The designer applications are configured to monitor activities when respective users are creating RPA workflows, capture sequences of the activities in the respective workflows, cause the captured sequences of activities in the respective workflows, the respective workflows themselves, or both, to be stored in the database, and call the one or more trained ML models. The server is configured to train the one or more ML models using the stored workflows to identify one or more next sequences of activities after developers add and/or modify one or more activities in a workflow. The one or more trained ML models are configured to analyze the current workflow as a current user adds or modifies the activities in the current workflow, detect that one or more of the added and/or modified activities are indicative of a next sequence of activities by at least a suggestion confidence threshold, and suggest the next sequence of activities to the user when the one or more trained ML models detect that the suggestion confidence threshold has been met or exceeded for the next sequence of activities.

In another embodiment, a computer program is embodied on a non-transitory computer-readable medium. The program is configured to cause at least one processor to monitor activities in an RPA workflow when a user is creating the RPA workflow and capture sequences of the monitored activities in the RPA workflow, the RPA workflow itself, or both. The program is also configured to cause the at least one processor to send the captured sequences of activities, the RPA workflow, or both, to a first ML model for analysis. The program is further configured to cause the at least one processor to receive one or more suggested next sequences of activities from the first ML model and suggest the one or more suggested next sequences of activities to a user.

In yet another embodiment, a computer-implemented method includes receiving a plurality of collected workflows from one or more RPA designer applications and training one or more ML models using the plurality of collected workflows to identify one or more next sequences of activities after developers add and/or modify one or more activities in a workflow. The computer-implemented method also includes making the one or more trained ML models available to the one or more RPA designer applications after the training.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6B is a screenshot illustrating the designer application of FIG. 6A after the user has indicated that the suggested next sequence of activities is correct and the sequence has been added to the workflow, according to an embodiment of the present invention.

DETAILED DESCRIPTION OF THE EMBODIMENTS

Figure 1:
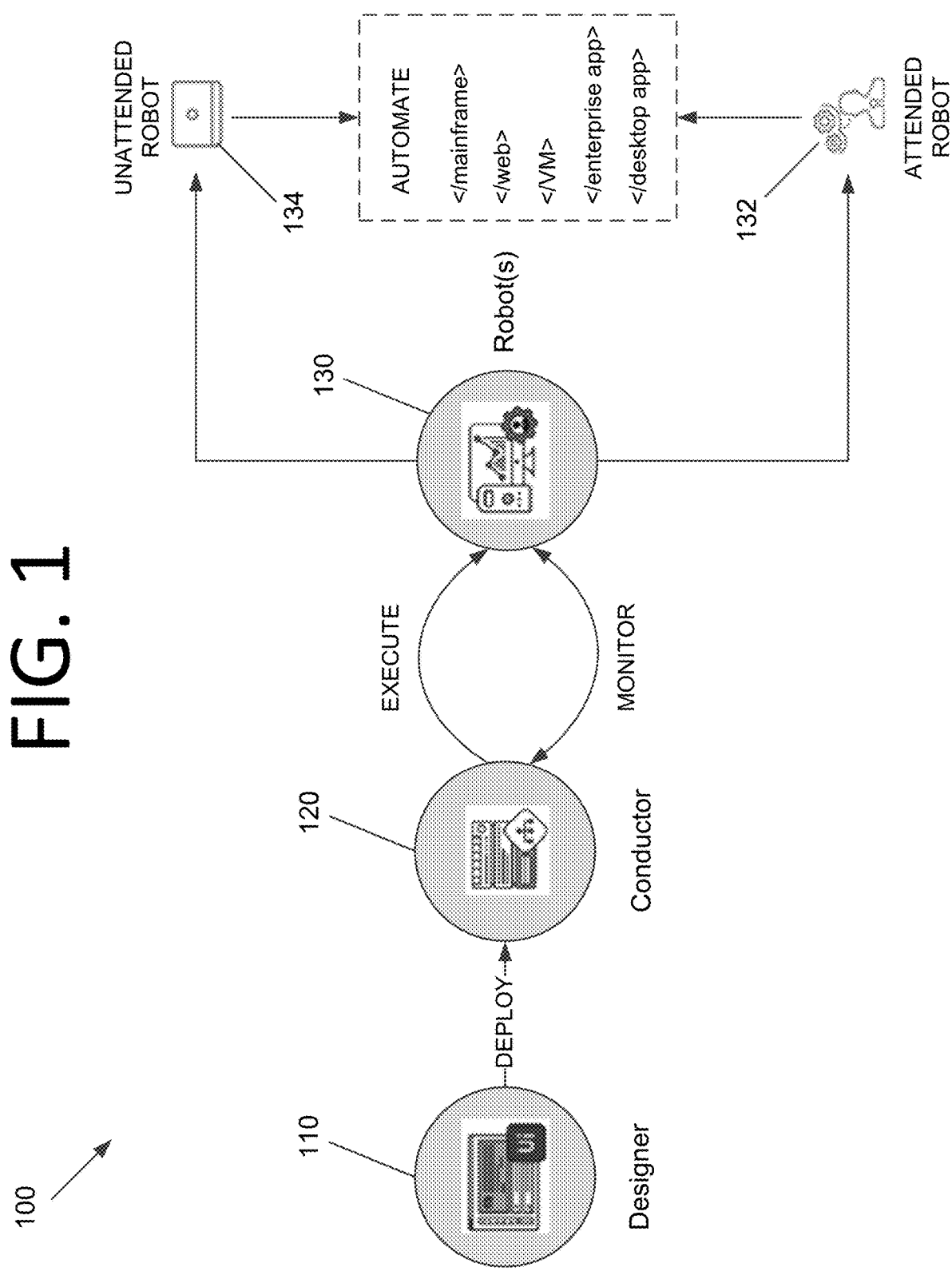
FIG. 1 is an architectural diagram illustrating an RPA system, according to an embodiment of the present invention.

Some embodiments pertain to automatic completion of RPA workflows using ML. As used herein ML may refer to deep learning (DL) (e.g., deep learning neural networks (DLNNs)), shallow learning (e.g., shallow learning neural networks (SLNNs)), any other suitable type of machine learning, or any combination thereof without deviating from the scope of the invention. Such embodiments may intelligently and automatically predict and complete the next series of activities in workflows (e.g., one, a few, many, the remainder of the workflow, etc.) using ML techniques. Activities that users create and/or modify while creating workflows may be captured and stored in a database over a period of time. An ML model may then be trained on a suitable dataset (e.g., an extensible application markup language (XAML) file dataset) that includes the workflows containing sequences of activities created by RPA developers. XAML files may contain the information used to create RPA workflows (e.g., activities, parameters, activity flow, etc.).

Once the ML model is trained, files (e.g., XAML files) storing information with respect to a workflow that a developer is currently building may be passed by an RPA designer application as input data to the ML model. The ML model may then consume this input and predict the next sequence of activities for autocompletion. The format of this predicted output may also be an XAML file in some embodiments. If the current sequence of activities in the workflow does not lead to a prediction of a next sequence of activities with at least a predetermined confidence threshold (i.e., a suggestion confidence threshold), the designer application may continue to periodically pass the workflow information to the XAML model as the developer continues to create the workflow, and at that point, a suggestion of a next sequence of activities may be provided if the prediction meets the suggestion confidence threshold.

Training of a global ML model may occur on the server side so a larger cache of workflow data from RPA developers can be stored and analyzed to find patterns. Also, servers tend to have heavy processing and graphical processing unit (GPU) resources, which allows training to occur more rapidly. However, training of one or more ML models may occur on the same computing system, on different computing systems, on the client side, on the server side, or on any other computing system(s) and/or location(s) without deviating from the scope of the invention.

In some embodiments, local models may be trained for each RPA developer to take into account individual developer styles and preferences. For example, a developer may prefer to send a certain email after a sequence of activities, may prefer certain variable types, etc. Once trained, global and local ML models could be pushed to the RPA developer application or made available to the RPA application remotely (e.g., executed on the server side at the request of the RPA developer application). If no local ML model has been developed for that user, the global ML model can be used. In some embodiments, the local ML model may be applied first, and if no next sequence is predicted (e.g., the confidence threshold for the local model is not met), the global ML model may then be applied to attempt to find a sequence for suggestion. In certain embodiments, the local ML model and the global ML model may have different confidence thresholds.

Because it learns from workflow data from multiple or many RPA developers, the global ML model may be updated less frequently and may take longer to train. The local model, on the other hand, uses the workflow data from a given developer. Thus, in some embodiments, the global model may be updated every few weeks, whereas the local model may be updated every few days. Naturally, the speed and frequency with which each model can be trained depends on the given implementation and processing resources.

Once trained, the ML model, or models, may receive user confirmation with respect to the auto-created sequences of the workflow in order to complete that portion of the workflow. As more and more workflow sequences are captured and stored over time, the ML model, or models, may be retrained to predict a larger number of sequences and/or to more accurately make predictions. Auto-completion may occur in real-time in some embodiments to save time and effort by the user or developer.

In some embodiments, a developer may start building his or her workflow from scratch. As a step (i.e., an activity) is added to the workflow, the ML model (local, global, or both) may analyze the step, and potentially one or more preceding step(s) in a sequence, and check whether one or more sequences may potentially be desired following that step that meet at least a predetermined probabilistic threshold. Once the user adds an activity to the workflow, the last N activities, including this newly added activity, may be considered by the ML model to check whether a next logical sequence of activities can be predicted and autocompleted. This possibility may be determined by the threshold confidence level of the model prediction, which may be above 90% in some embodiments. If the confidence level for stored sequences to be suggested based on the current sequence of activities in the workflow is less than the threshold confidence level, then no suggestion may be provided. The ML model may then be run again when the next activity is added until the suggestion confidence threshold is met. Thus, there are both confidence thresholds determined for each possible sequence to potentially be suggested and a suggestion confidence threshold that these sequences must meet in order to be suggested.

It is possible that more than one possible next sequences of activities may exceed the suggestion confidence threshold. If this is the case, the user/developer may be presented with these sequences as options to potentially complete one or more next steps in the workflow. In certain embodiments, the sequences are ranked in order of their respective confidence thresholds. The user/developer may then select the pertinent next sequence, which is automatically added to the workflow.

In certain embodiments, this may include adding the activities to the workflow, setting declarations and usage of variables (i.e., programming variables), reading from/writing to certain files, and/or any other desired pertinent steps to logically conclude a sequence in a workflow without deviating from the scope of the invention. An RPA workflow, somewhat similar to a programming language, typically has variables of different types that are used during execution of the workflow. If these variables are not declared as a proper datatype, the workflow may run into errors. Thus, correct data types of a variables to hold numbers (e.g., Integer), text (e.g., String), etc. should be selected. Thus, some embodiments both perform autocompletion of workflows and internally declare the associated variables of the correct type intelligently.

Per the above, in some embodiments, the ML model provides sequence predictions that meet or exceed a suggestion confidence score (i.e., the estimated probability by the ML model that a subsequence will be used following a given step or activity, or sequence thereof). The ML model may learn the confidence score based on training using many workflows as a whole and sequences within these workflows. Also per the above, if multiple sequences exceed the confidence threshold for a given step (e.g., at least two logical branches exist since two or more sequences have a confidence score that meets or exceeds the threshold) the developer may be prompted with these sequences. The developer may then choose which sequence is correct (or in some embodiments, indicate that no sequence is correct). If a sequence is selected, the selected sequence is automatically added into the workflow. If not, the developer continues the workflow development process. In some embodiments, over a period of time, the ML model may learn more and more about the developer's personal style, logic, and conventions. The ML model may then use this information to predict and complete the workflow based on how the ML model estimates that the developer would have personally desired.

In some embodiments, the ML model may be trained via attended feedback, unattended feedback, or both. Attended feedback includes where the developer is actively involved in producing the training data. For instance, the RPA developer may be prompted for reasons why he or she did not want to use the predicted next sequence of activities and provide this to the server side for training. Unattended feedback includes information gleaned without the user's active participation. For instance, the mere fact that a user has rejected the sequence of activities may provide information that the ML model may not be working as intended for that given user. The activities that the developer includes in the workflow after rejecting the suggestion may then be used to train the model regarding what the developer is actually looking for. If this tends to be the case globally, this information could also be used to train the global ML model.

The attended feedback, unattended feedback, or both, provide input for training the local and global ML models. The global ML model is a generalized model for all RPA developers or a subset of RPA developers, and the local ML model is personalized and user-specific. If the local ML model does not exist or does not find a sequence that meets or exceeds the suggestion confidence threshold, the global ML model may be consulted to attempt to find a suggestion meets or exceeds the suggestion confidence threshold for prediction. In certain embodiments, more than two ML models may be used. For example, some embodiments may employ a local model for a given developer and then N next models (e.g., programming team, then group, then company, etc.) that apply to increasingly large groups of developers, all the way up to a global model.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
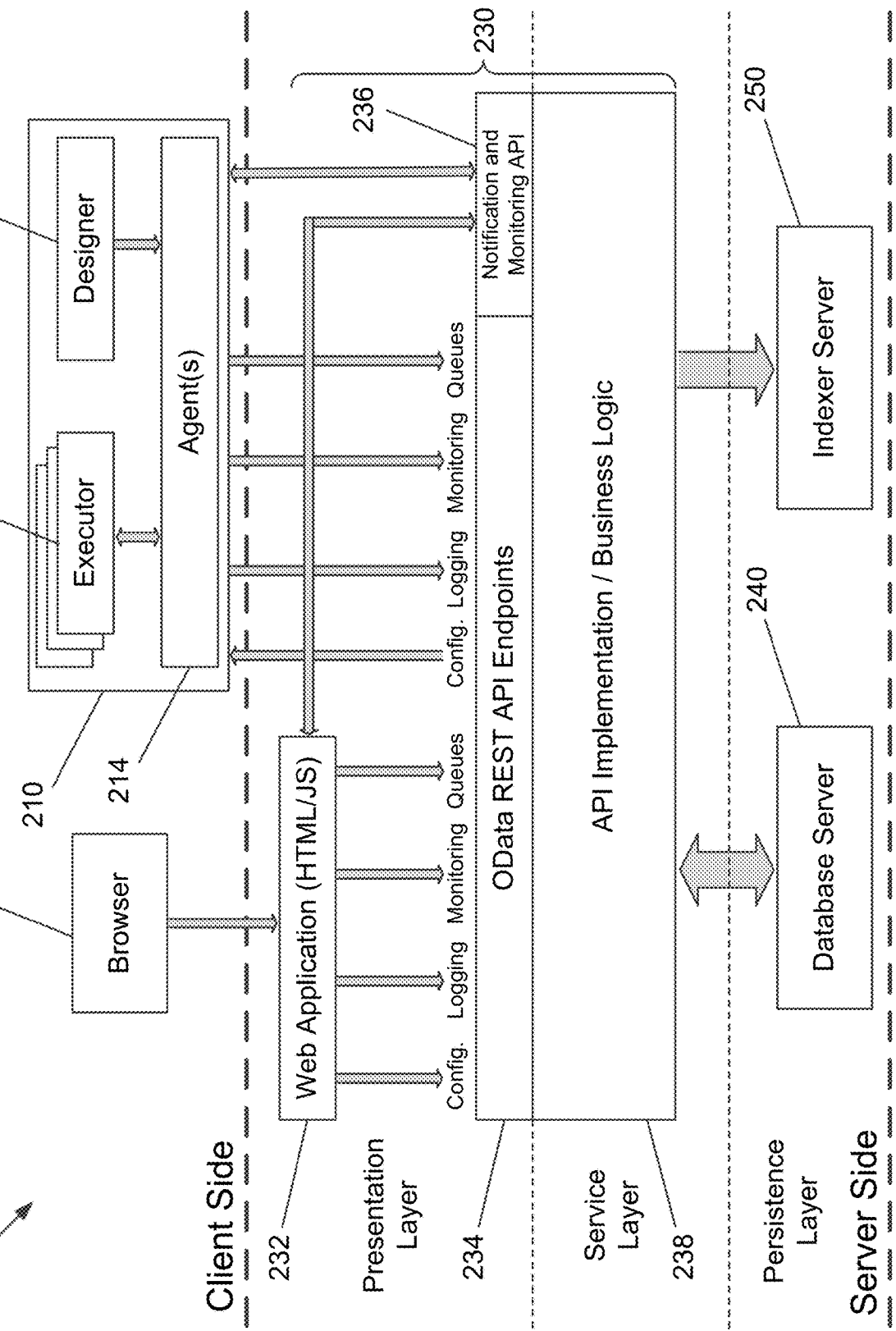
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
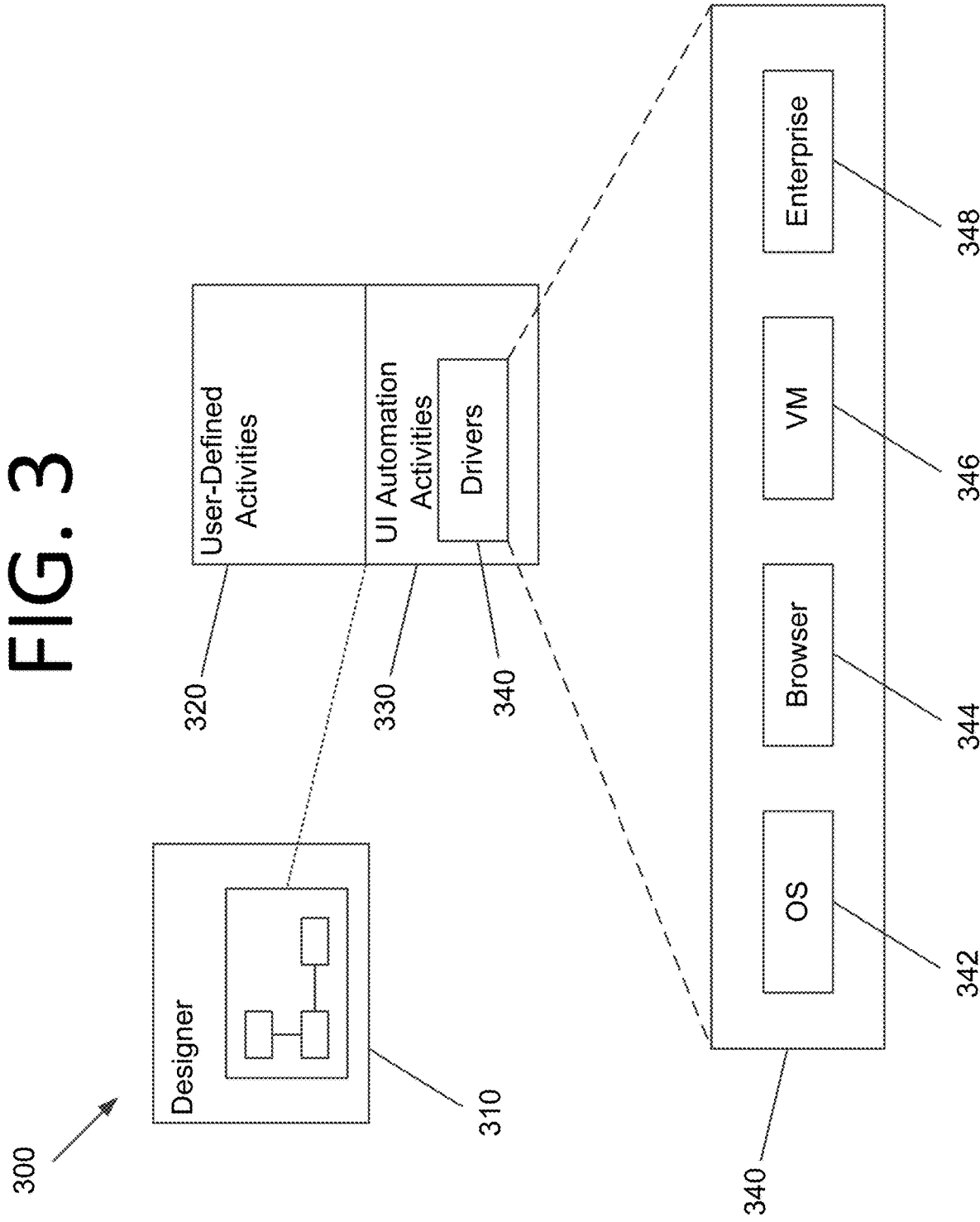
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
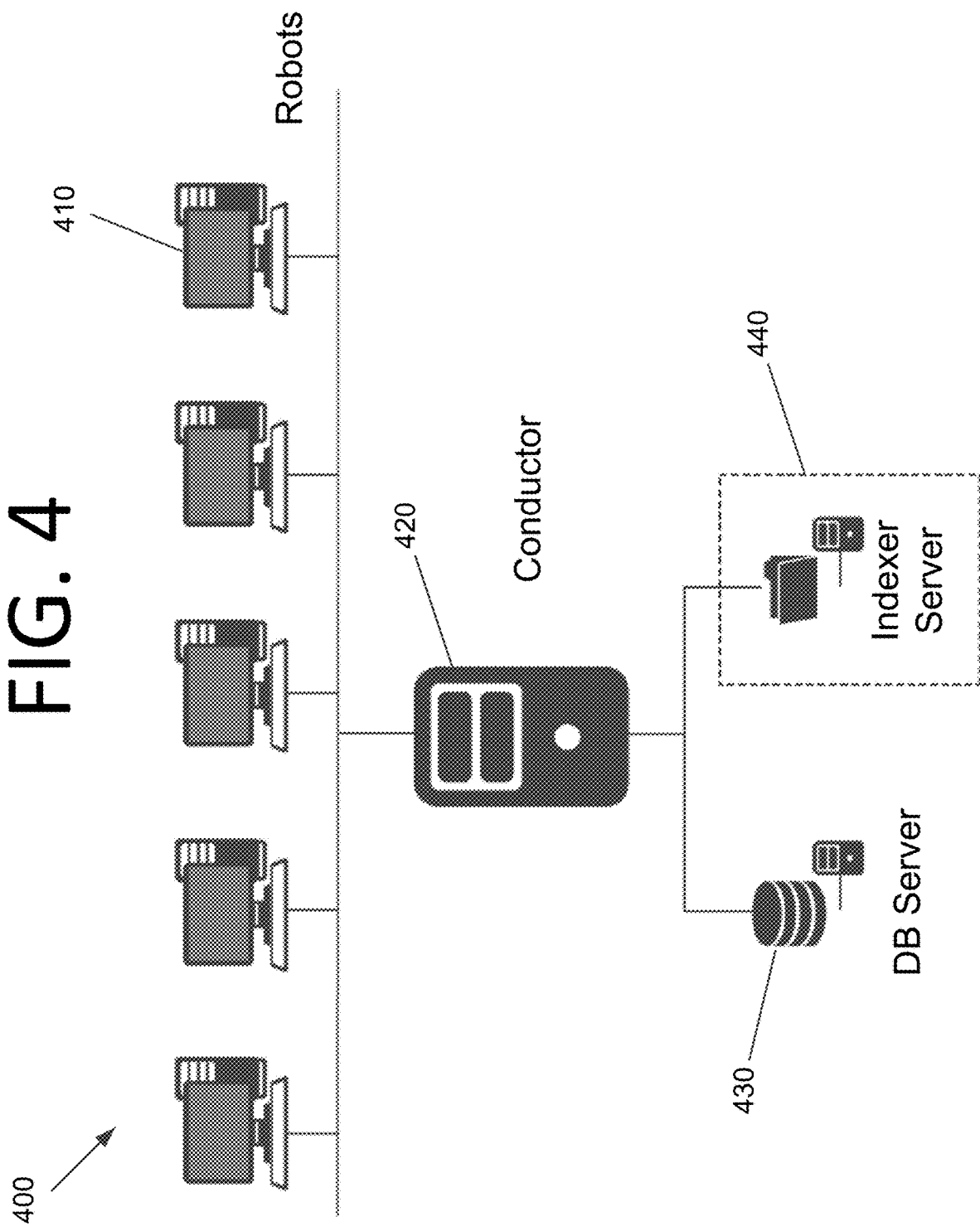
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
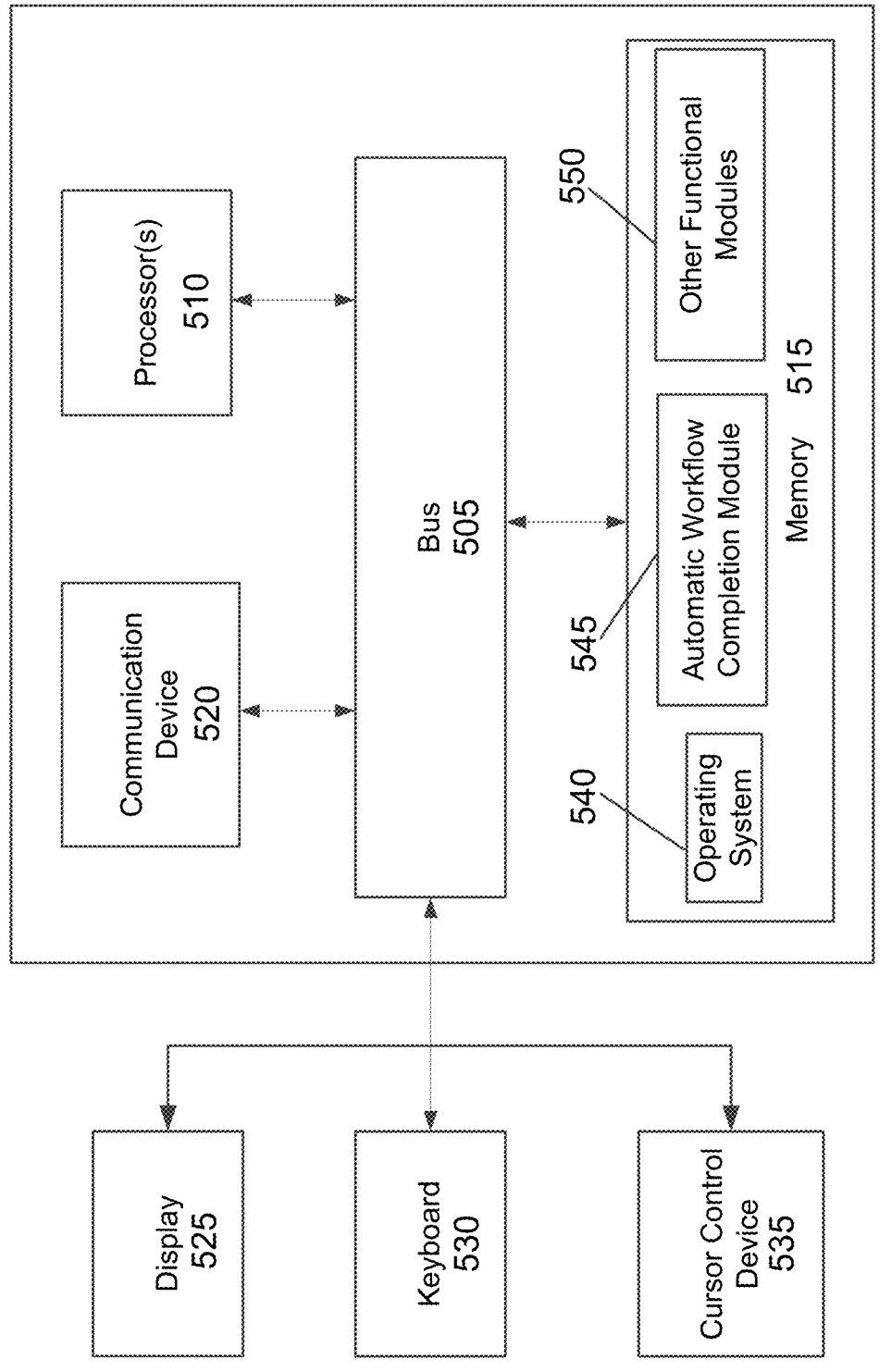
FIG. 5 is an architectural diagram illustrating a computing system configured to automatically complete RPA workflows using ML, according to an embodiment of the present invention.

FIG. 5 is an architectural diagram illustrating a computing system 500 configured to automatically complete RPA workflows using ML, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideB and (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automatic workflow completion module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

By way of nonlimiting example, consider a workflow in which a user of an RPA designer application includes sequences for opening a web browser and searching for certain information on the Internet where the browsed webpage contains a table. The user may then add activities to open an Excel® workbook and copy-and-paste this table into an Excel® spreadsheet. In the background, the designer application may track the actions taken by the user as the user creates workflows and consult one or more ML models after each activity or a sequence of activities. If the user tends to include this sequence of activities repeatedly following adding a certain activity, the ML model(s) may learn to predict that the user will likely perform this sequence of actions based on a certain context and beginning activity (e.g., when the user adds an activity that launches a web browser, the user then adds activities to visit the website and copy-and-paste the table into the Excel® spreadsheet).

Once this sequence is learned (e.g., user-specific, common among users in a company, common globally, etc.), upon adding the task to open the web browser, the ML model may indicate that one or more next sequences of activities meet or exceed the suggestion confidence level, and the designer application may prompt the user with the choice to select a next sequence to add to the workflow. Alternatively, in some embodiments, the designer application may automatically add the sequence to the workflow without the user's input when the suggestion confidence threshold is met or exceeded, or select a next sequence with the highest confidence threshold when multiple sequences meet or exceed the suggestion confidence threshold. In still other embodiments, the designer application may prompt the user with the choice to add the learned sequence to the workflow if the confidence level of a next sequence of activities is below a relative certainty threshold but above a suggestion confidence threshold and automatically add the sequence to the workflow without the user's input if the confidence level of the next sequence of activities is at or above the relative certainty threshold. For example, the sequence of the workflow may include automatically adding a workbook path inside the Excel Application scope, dropping a "Write Cell" or "Write Range" activity based on the ML model, rename the sheet as per a convention to suit the current problem, write the results into the Excel® spreadsheet, and drop a "Log Message" activity to write logs regarding the progress. The designer application may complete the workflow automatically when the user clicks an "Enter Key" on the screen, for example. Furthermore, after predicting that the user wishes to write the table in an Excel® spreadsheet, the designer application in this example gives an appropriate name to the file, starting cell, and sheet name, provides variable declarations, provides property declarations, and logs a message to the user regarding whether the operations were successful.

In general, completion of a workflow such as opening Excel®, naming a file, entering a starting cell, entering a sheet name, and declaring the variables takes around 65-75 seconds for an experienced user to complete. To save time in completing these steps, which tend to be generic to Excel® writing operations, the ML model of some embodiments may predict the next sequence of the workflow, a suggestion may be provided to the developer, and the developer may accept the suggestion in 2-3 seconds, depending on computing power. This may decrease development time by over one minute in this example. Where an RPA developer creates workflows with such a sequence frequently, the savings in development time can be substantial.

If the user is satisfied with the predicted next sequence of activities, this next sequence of activities may be added to the workflow. If user is not satisfied with the predicted next sequence of the workflow provided by the ML model (e.g., the user's personal preferences are different, the user's style of building workflows is different, the business use case requires something else, there is a logical error, etc.), feedback may be given to retrain the ML model. If the feedback is user-specific, the ML model may be retrained for that user's preferences and a custom model may be created. Over time, the ML model learns what the user is working on and suggests next sequences of workflows accordingly. If the feedback is not user-specific (e.g., for a global model or a model for a larger group of users than just the individual user), the feedback may be collected with feedback from other users over a period of time, and the ML model may then be retrained to be more accurate for all users or the group of users.

Figure 6A:
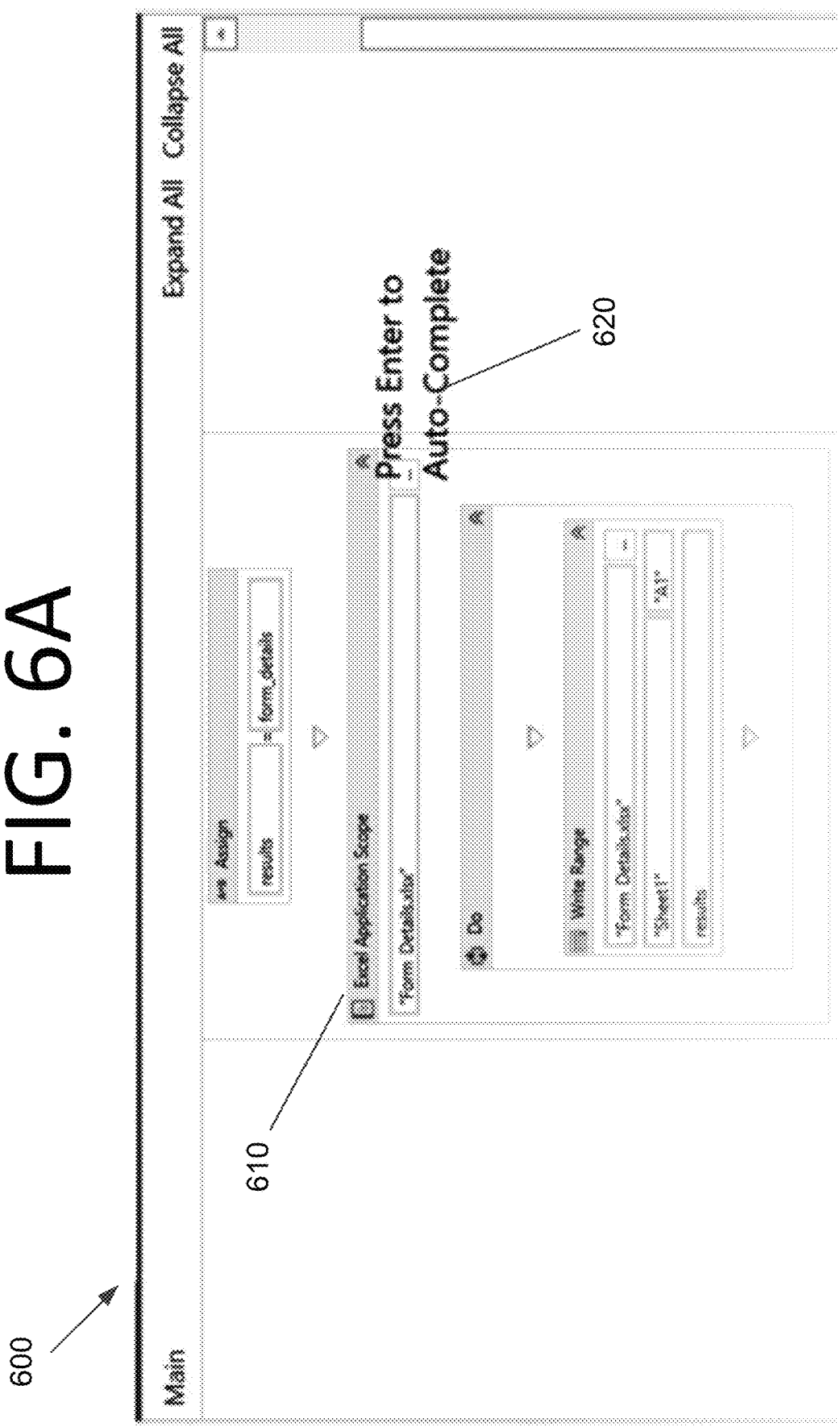
FIG. 6A is a screenshot illustrating a designer application after a potential next sequence of activities has been detected by an ML model, according to an embodiment of the present invention.

FIG. 6A is a screenshot 600 illustrating a designer application 600 after a potential next sequence of activities has been detected by an ML model, according to an embodiment of the present invention. Here, the developer has dropped an Excel® Application Scope activity 610 into the workflow. The ML model, which is run by the designer application in this embodiment, analyzes the logic of the workflow and determines that a subsequent sequence of activities may be desired by the user. The ML model then provides the suggested sequence to the designer application, which displays it to the user with a suggestion to complete the workflow automatically (i.e., providing a "Press Enter to Auto-Complete" prompt 620).

Figure 6B:
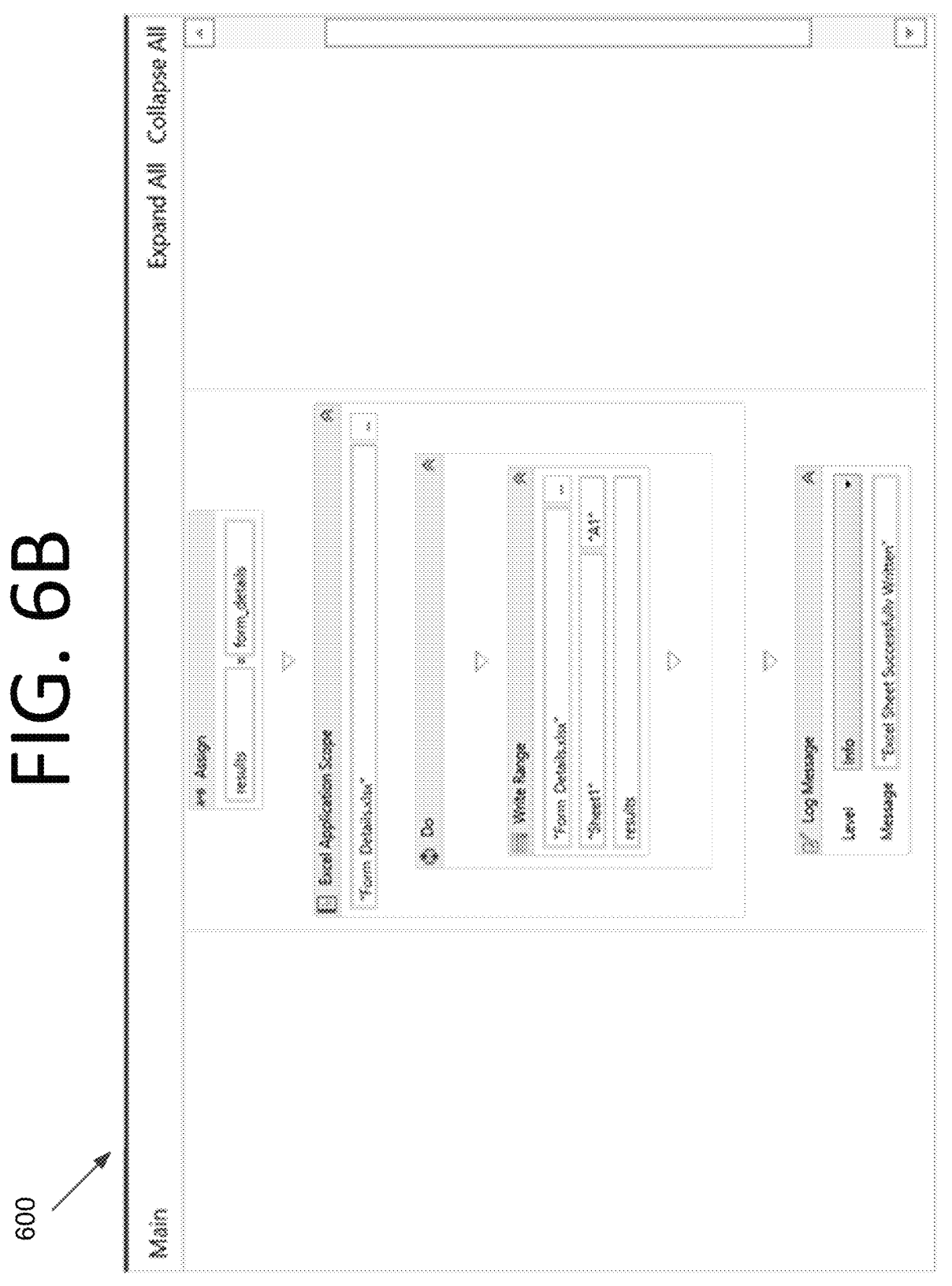
Figure 6C:
FIG. 6C is a screenshot illustrating an auto-completed variables tab, according to an embodiment of the present invention.
Figure 6D:
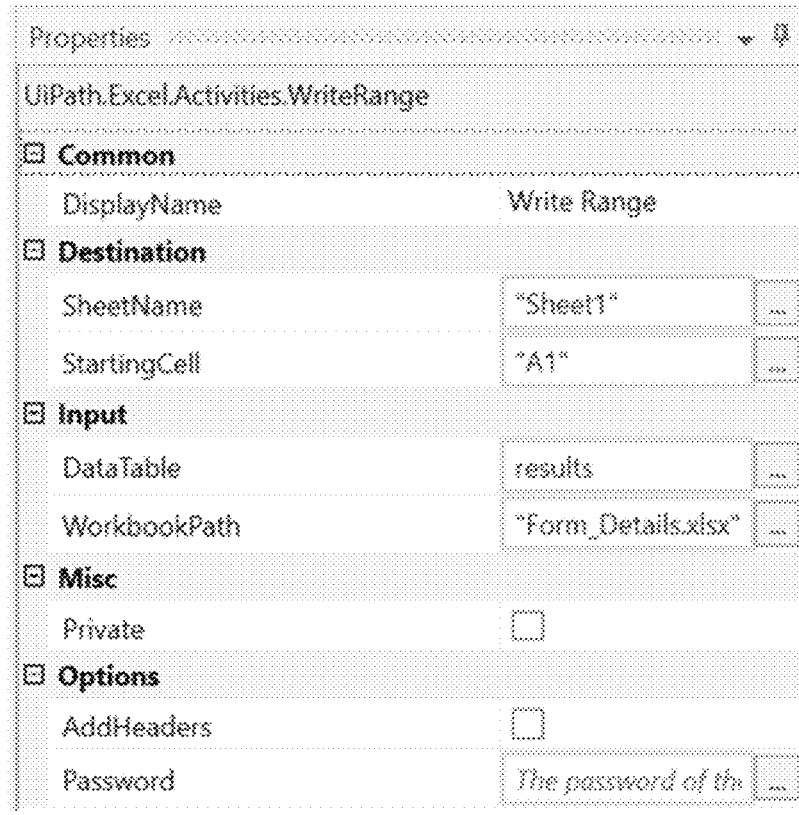
FIG. 6D is a screenshot illustrating an auto-completed properties tab, according to an embodiment of the present invention.

After the developer presses enter, the sequence is automatically added to the workflow, as shown in FIG. 6B. In some embodiments, the sequence may also take into account the developer's personal style and/or preferences. The workflow may not be complete, or the developer can choose to add additional actions to the workflow if further tasks are to be accomplished. Variables and properties are also automatically completed based on the current workflow logic in variables tab 630 (see FIG. 6C) and properties tab 640 (see FIG. 6D), respectively.

Figure 7:
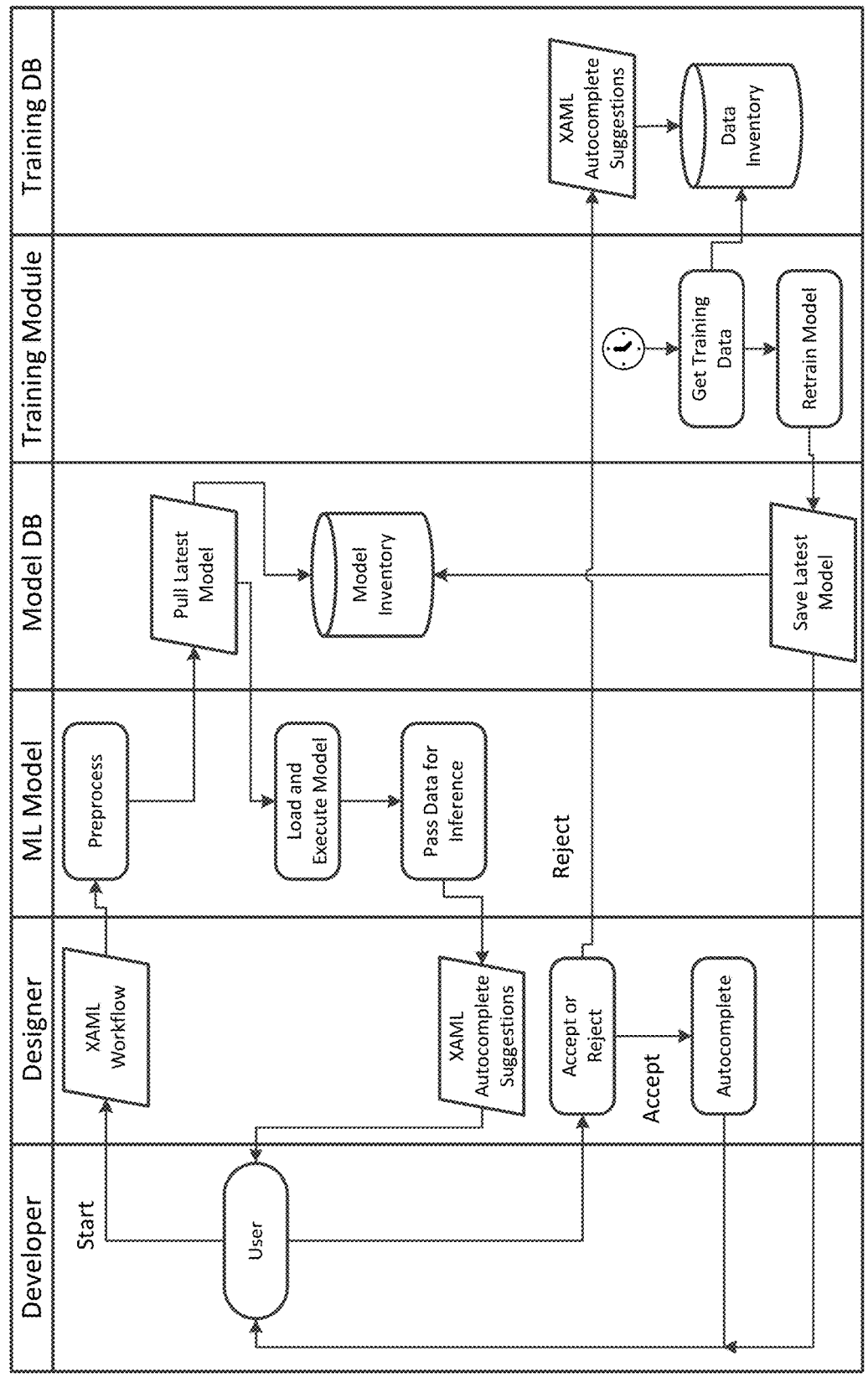
FIG. 7 is a flow diagram illustrating a process for rejecting or accepting and automatically completing a suggested next sequence of activities for an RPA workflow, according to an embodiment of the present invention.

FIG. 7 is a flow diagram illustrating a process 700 for rejecting or accepting and automatically completing a suggested next sequence of activities for an RPA workflow, according to an embodiment of the present invention. The process begins with a developer creating a workflow in a designer application, which the designer application saves as an XAML workflow as the user adds and modifies activities in the workflow. When the user adds or modifies an activity, the current XAML workflow is sent to an ML model for preprocessing. During preprocessing, the relevant data from the XAML file is extracted, and irrelevant data is stripped. In certain embodiments, the preprocessing may include adding or deriving relevant data for consideration by the ML model to further improve accuracy (e.g., adding more relevant metadata variables).

After preprocessing, the latest ML model is pulled from a model inventory database and the latest ML model is loaded and executed on the preprocessed data. Data resulting from the execution of the ML model is then passed for inference to the designer application (e.g., an XAML file including the suggested next sequence of activities), and the designer application uses this data to display the suggestion to the user. If the user then accepts the suggestion, the developer application adds the next sequence of activities to the workflow and the user may then continue developing the workflow.

If the user rejects the suggestion, the user may still continue developing the workflow. However, the XAML of the rejected workflow is then sent to a data inventory database of XAML autocomplete suggestions that were rejected. After some time passes, or when manually instructed to do so, a training module for training ML models pulls the rejected autocomplete suggestions from the data inventory database and uses these to retrain the ML model. Once retrained, this latest version of the ML model is then saved in the model inventory database to be used by the designer application.

Figure 8:
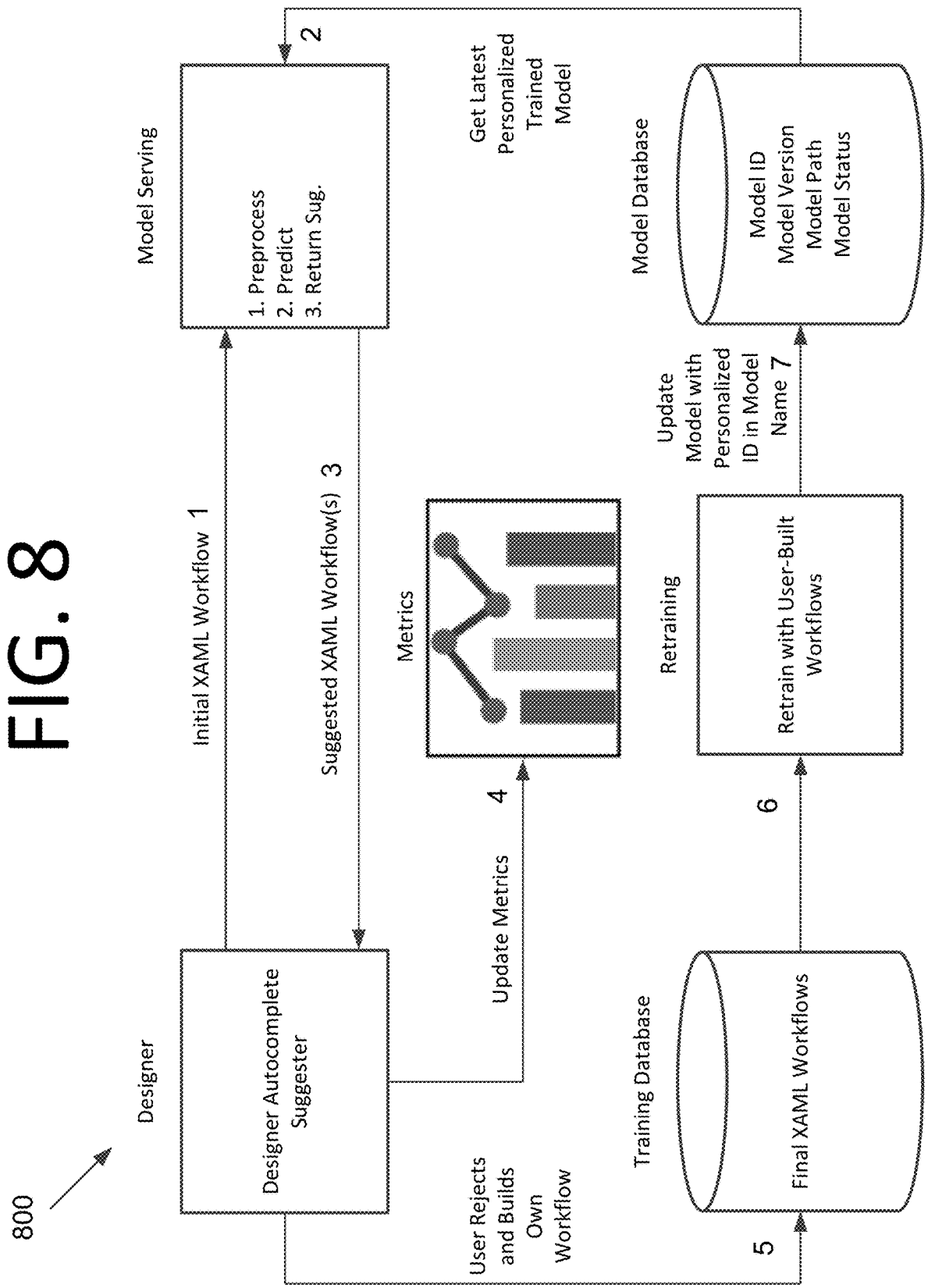
FIG. 8 is an autocompletion architectural diagram for both a personalized and generalized flow, according to an embodiment of the present invention.

FIG. 8 is an autocompletion architectural diagram 800 for both a personalized and a generalized flow, according to an embodiment of the present invention. When a user starts developing the workflow and after one or more activities are added to the workflow, the initial XAML workflow is passed (1) from the designer application to one or more retrieved (2) ML models to predict one or more potential next sequences of activities for suggestion to the user. In some embodiments, the pretrained ML models are personalized (local) and generalized (global). If the local ML model fails to find a sequence for suggestion that exceeds a suggestion confidence interval, the global ML model may be used. If no suggestions meet the suggestion confidence threshold, the designer application may continue to send XAML workflows as the user adds to and/or modifies the workflow.

If one or more suggestions are provided (e.g., as XAML workflows), these are suggested (3) to the user in the designer application. Whether the user accepts or rejects the suggestion(s), and which suggestion was selected (if any), may be used to update metrics (4) pertaining to predicted activities (e.g., probability scores for given metrics) providing an indication as to how a given ML model is performing. If user rejects the suggested activity or sequence of activities, the user can continue to build his or her own workflow. The designer application then continues to monitor the user's workflow, and after completion thereof, sends the completed workflow (5) to a training database as a feedback that will be used as training data in the future. In some embodiments, this data may be used to retrain the local ML model, the global ML model, or both.

At some point after storing the user's workflow in the training database, the ML model(s) are retrained (6). If the prediction scores improve over the previously trained ML model(s), the newly trained ML model(s) will be considered as the latest best model and will be uploaded (7) to a model database to serve as the ML model(s) for future processing.

In some embodiments, when the designer application is loaded, multiple ML models may be downloaded and used. For instance, a local ML model customized to the user and a global ML model trained using workflows from multiple or many users may be loaded. The designer application may first call the local ML model and see whether it returns any suggestions (e.g., one or more sequences met or exceeded a 90% suggestion confidence threshold). If so, the suggestion(s) may be provided to the user. If not, the global ML model may then be called to see whether one or more suggestions meet or exceed the suggestion confidence threshold.

Model details for the corresponding ML models (e.g., local and global) may be updated in separate tables in the model database in some embodiments. For instance, the model database may include fields such as model ID, model version, model path, model status, and/or any other suitable fields without deviating from the scope of the invention. Such fields may be provided when serving the respective ML model.

Figure 9:
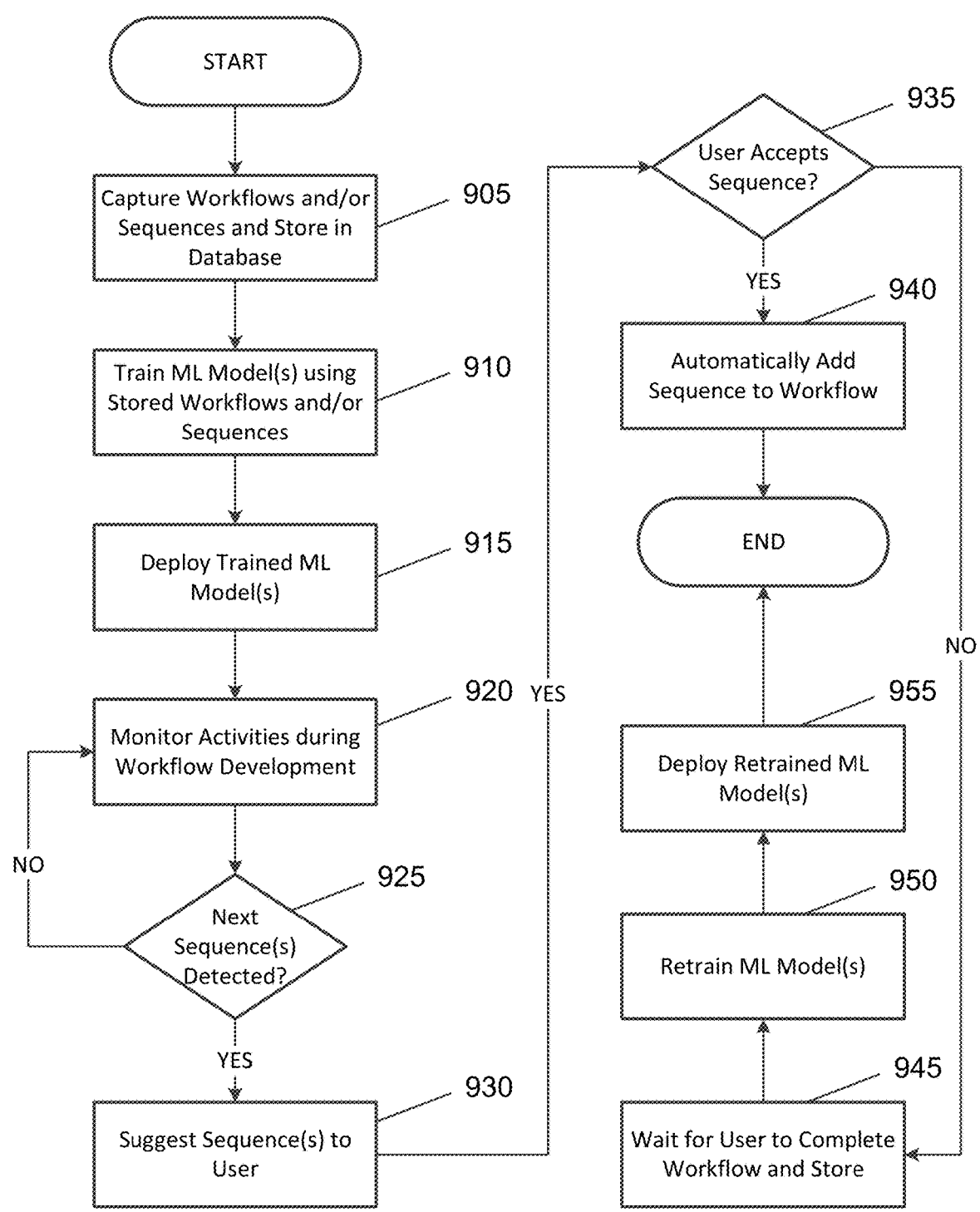
FIG. 9 is a flowchart illustrating a process for automatically completing RPA workflows using ML, according to an embodiment of the present invention.

FIG. 9 is a flowchart illustrating a process 900 for automatically completing RPA workflows using ML, according to an embodiment of the present invention. The process begins capturing created workflows, sequences of activities in the created workflows, or both, by a designer application and storing them in a database at 905. In some embodiments, the workflows, sequences of activities, or both, may be in XAML format. The stored workflows, sequences of activities, or both, are then used to train one or more ML models at 910. The trained ML model(s) are then deployed to user computing systems or otherwise made available to users at 915.

Once deployed or made available, a designer application monitors user activities during workflow development and provides these to at least one of the one or more ML models at 920. In some embodiments, multiple ML models may be called and executed in series if a previously executed ML model does not detect a next sequence of activities. If the ML model(s) do not detect one or more potential next sequences of activities meeting or exceeding a suggestion confidence threshold at 925, the process returns to step 920. However, if one or more potential next sequences of activities meeting or exceeding a suggestion confidence threshold are detected at 925, the sequence(s) are suggested to the user at 930.

If the user accepts the suggestion at 935, the suggested sequence of activities is automatically added to the workflow at 940. However, if the user rejects the suggestion, the designer application waits for the user to complete the workflow and then causes the completed workflow to be stored at 945. The completed workflow and potentially some or many other completed workflows are then used to retrain the ML model(s) at 950, and the retrained ML model(s) are deployed or made available at 955.

The process steps performed in FIG. 9 may be performed by a computer program, encoding instructions for the processor(s) to perform at least part of the process(es) described in FIG. 9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a plurality of developer computing systems executing respective robotic process automation (RPA) workflow designer applications;
a database storing workflows, the workflows comprising sequences of activities; and
a server, connected to the plurality of computing systems and the database over a communication network, the server configured to train one or more machine learning (ML) models, wherein
the RPA workflow designer applications:
monitor activities when respective developers are creating robotic process automation (RPA) workflows with respective RPA workflow designer applications,
capture sequences of the activities in the respective RPA workflows,
cause the captured sequences of activities in the respective RPA workflows and the respective RPA workflows themselves to be stored in the database over the communication network, and
call the one or more trained ML models over the communication network,
the server trains the one or more ML models using the stored captured sequences of activities and the RPA workflows to identify one or more next sequences of activities after the developers add and/or modify one or more activities in an RPA workflow and provide a confidence level for the identification, and
the one or more trained ML models executed by the server:
analyze a current RPA workflow as a current developer adds or modifies the activities in the current RPA workflow to a respective RPA workflow designer application,
detect that one or more of the added and/or modified activities within a graphical user interface (GUI) of the RPA workflow designer application are indicative of a next sequence of activities by at least a suggestion confidence threshold based on the analysis of the current RPA workflow as the current developer adds or modifies the activities in the current RPA workflow, the detection based on running parameters of the current RPA workflow through the one or more trained ML models and producing the sequence of next steps and the suggestion confidence threshold as an output, and
suggest the next sequence of activities output by the one or more trained ML models to the respective RPA workflow designer application and display the suggestion via the GUI of the RPA workflow designer application when the one or more trained ML models indicate that the suggestion confidence threshold has been met or exceeded for the next sequence of activities.

2. The system of claim 1, wherein after the one or more trained ML models suggest the next sequence of activities, when the current developer provides confirmation in the RPA workflow designer application that the next sequence of activities is correct, the RPA workflow designer application is configured to automatically add the next sequence of activities to the workflow.

3. The system of claim 2, wherein the automatically adding of the next sequence of activities to the workflow comprises setting declarations and usage of variables, setting properties, reading from and/or writing to files, or any combination thereof.

4. The system of claim 1, wherein after the one or more trained ML models suggests the next sequence of activities, when a developer provides an indication in the RPA workflow designer application that the next sequence of activities is incorrect, the RPA workflow designer application is configured to cause the current workflow to be stored in the database for subsequent retraining of the one or more trained ML models after the current developer completes the current workflow.

5. The system of claim 1, wherein when more than one next sequences of activities meet or exceed the suggestion confidence threshold, the RPA workflow designer application is configured to provide the developer with an option to select from the more than one sequences of activities meeting or exceeding the suggestion confidence threshold.

6. The system of claim 1, wherein the suggestion confidence threshold is a probabilistic threshold based on a confidence score learned during the training of the one or more trained ML models by inputting sample parameters of workflows into the one or more ML models and determining an accuracy of the predictions of the one or more ML models.

7. The system of claim 1, wherein the server is configured to retrain the one or more trained ML models after a predetermined period of time has passed, after a predetermined amount of data has been collected since the training of the one or more trained ML models, after a predetermined number of developers have automatically completed workflows, after a predetermined number or percentage of developers have rejected suggestions from the one or more trained ML models, or any combination thereof.

8. The system of claim 7, wherein at least one of the one or more trained ML models is configured to:
learn developer-specific style, logic, conventions, or any combination thereof, as a developer develops workflows over time; and
suggest next sequences of activities based on the learned developer-specific style, logic, conventions, or any combination thereof, the next sequences of activities learned by retraining the one or more ML models using parameters from workflows that the developer completed, the completed workflow parameters used for retraining when a previous suggestion by the one or more ML models was declined by the developer.

9. The system of claim 1, wherein the system is configured to automatically complete the next sequence of activities without further developer input.

10. The system of claim 1, wherein
the one or more trained ML models comprise a local ML model and a global ML model,
the RPA workflow designer application is configured to call the local ML model first,
when the local ML model suggests one or more next sequences of activities that meet or exceed the suggestion confidence threshold, the RPA workflow designer application is configured to provide the one or more next sequences of activities from the local ML model to the developer, and
when the local ML model does not suggest at least one next sequences of activities that meet or exceed the suggestion confidence threshold, the RPA workflow designer application is configured to call the global ML model.

11. The system of claim 10, wherein the local ML model and the global ML model utilize different suggestion confidence thresholds.

12. The system of claim 1, wherein when a first ML model of the one or more trained ML models does not provide a suggestion of at least one next sequence of activities meeting or exceeding the suggestion confidence threshold, the RPA workflow designer application is configured to call a second ML model of the one or more trained ML models, a third ML model of the one or more trained ML models, and so on until at least one next sequence of activities meeting or exceeding the suggestion confidence threshold has been found or all of the one or more trained ML models have been called without identifying at least one next sequence of activities meeting or exceeding the suggestion confidence threshold.

13. The system of claim 1, wherein the one or more trained ML models are executed on the plurality of developer computing systems.

14. The system of claim 1, wherein the one or more trained ML models are trained using attended developer feedback, unattended developer feedback, or both.

15. The system of claim 1, wherein the workflows are in extensible application markup language (XAML) format.

16. A computer program implementing an RPA workflow designer application embodied on a non-transitory computer-readable medium of a developer computing system, the program configured to cause at least one processor to:
monitor activities in a robotic process automation (RPA) workflow of the RPA workflow designer application executed by the developer computing system when a developer is creating an RPA workflow;
capture and store sequences of the monitored activities in the RPA workflow and the RPA workflow itself in a database connected to the developer computing system via a communication network;
send, over the communication network, the captured sequences of activities and the RPA workflow to one or more trained machine learning (ML) models of a server for analysis, the one or more trained ML models configured to:
analyze the captured sequences of activities and the RPA workflow from the RPA workflow designer application,
detect that one or more added and/or modified activities of the RPA workflow within a graphical user interface (GUI) of the RPA workflow designer application are indicative of a next sequence of activities by at least a suggestion confidence threshold based on the analysis of the captured sequences of activities and the RPA workflow as the developer adds or modifies the activities in the RPA workflow, the detection based on running parameters of the RPA workflow through the one or more trained ML models and producing the sequence of next steps and the suggestion confidence threshold as an output, and
suggest the next sequence of activities output by the one or more trained ML models to the RPA workflow designer application;
receive the one or more suggested next sequences of activities from the one or more ML models, the one or more suggested next sequences of activities provided as an output by the one or more ML models based on the captured sequences of activities and the RPA workflow as an input; and
display the one or more suggested next sequences of activities via the GUI of the RPA workflow designer application when the one or more ML models indicate that a suggestion confidence threshold has been met or exceeded for the one or more next sequences of activities, wherein
the one or more ML models are trained using attended developer feedback, unattended developer feedback, or both.

17. The computer program of claim 16, wherein when more than one next sequences of activities meet or exceed the suggestion confidence threshold, the program is configured to cause the at least one processor to provide the developer with an option to select from the more than one sequences of activities meeting or exceeding the suggestion confidence threshold.

18. The computer program of claim 16, wherein the suggestion confidence threshold is a probabilistic threshold based on a confidence score learned during the training of the one or more ML models by inputting sample parameters of workflows into the one or more ML models and determining an accuracy of the predictions of the one or more ML models.

19. The computer program of claim 16, wherein the one or more ML models are configured to:
learn developer-specific style, logic, conventions, or any combination thereof, as the developer develops workflows over time; and
suggest next sequences of activities based on the learned developer-specific style, logic, conventions, or any combination thereof, the next sequences of activities learned by retraining the one or more ML models using parameters from workflows that the developer completed, the completed workflow parameters used for retraining when a previous suggestion by the one or more ML models was declined by the developer.

20. The computer program of claim 16, wherein the program is further configured to cause the at least one processor to automatically complete the next sequence of activities without further developer input.

21. The computer program of claim 16, wherein
the one or more ML models comprise at least two ML models,
an ML model of the at least two ML models is a local ML model,
the program is configured to cause the at least one processor to call the local ML model first,
when the local ML model suggests one or more next sequences of activities that meet or exceed the output suggestion confidence threshold based on the captured sequences of activities, the program is configured to cause the at least one processor to provide the one or more next sequences of activities from the local ML model to the developer, and
when the local ML model does not suggest at least one next sequences of activities that meet or exceed the output suggestion confidence threshold, the program is further configured to cause the at least one processor to call a global ML model of the at least two ML models.

22. The computer program of claim 21, wherein the local ML model and the global ML model utilize different suggestion confidence thresholds.

23. The computer program of claim 16, wherein
the one or more ML models comprise at least three ML models, and
when a first ML model of the at least three ML models does not provide a suggestion of at least one next sequence of activities meeting or exceeding a suggestion confidence threshold, the RPA workflow designer application is configured to call a second ML model of the at least three ML models, a third ML model of the at least three ML models, and so on until at least one next sequence of activities meeting or exceeding the suggestion confidence threshold has been found or all of the at least three ML models have been called without identifying at least one next sequence of activities meeting or exceeding the suggestion confidence threshold.

24. The computer program of claim 16, wherein after suggesting the one or more suggested next sequences of activities to the developer, when the developer provides confirmation that a sequence of the next sequence of activities is correct, the program is further configured to cause the at least one processor to automatically add the developer-selected next sequence of activities to the RPA workflow.

25. The computer program of claim 24, wherein the automatically adding of the next sequence of activities to the workflow comprises setting declarations and usage of variables, setting properties, reading from and/or writing to files, or any combination thereof.

26. The computer program of claim 16, wherein after suggesting the one or more suggested next sequences of activities to the developer, when the developer provides an indication that the next sequence of activities is incorrect, the program is further configured to cause the at least one processor to cause the current workflow to be stored in a database for subsequent retraining of the one or more ML models after the developer completes the workflow.

27. A computer-implemented method, comprising:
receiving and storing in a database, by a server over a communication network, a plurality of collected sequences of activities and RPA workflows from one or more robotic process automation (RPA) workflow designer applications executed by a plurality of developer computing systems;
analyze, by the server, a current RPA workflow as a current developer adds or modifies the activities in the current RPA workflow;
analyze, by one or more trained ML models of the server, a current RPA workflow as a current developer adds or modifies the activities in the current RPA workflow, the one or more trained ML models having been trained using the plurality of collected activities and RPA workflows to identify one or more next sequences of activities after developers add and/or modify one or more activities in respective RPA workflows, the one or more trained ML models made available to the one or more RPA designer applications after the training by the server over the communication network;
detect, by the one or more trained ML models of the server, that one or more of the added and/or modified activities within a graphical user interface (GUI) of an RPA workflow designer application are indicative of a next sequence of activities by at least a suggestion confidence threshold based on the analysis of the current workflow as the current developer adds or modifies the activities in the current workflow, the detection based on running parameters of the current workflow through the one or more trained ML models and producing the sequence of next steps and the suggestion confidence threshold as an output; and
suggest, by the one or more trained ML models of the server, the next sequence of activities output by the one or more trained ML models to the RPA workflow designer application and display the suggestion via the GUI of the RPA workflow designer application when the one or more trained ML models indicate that the suggestion confidence threshold has been met or exceeded for the next sequence of activities,
wherein
the one or more trained ML models comprise a local ML model and a global ML model.

28. The computer program of claim 27, wherein the suggestion confidence threshold is a probabilistic threshold based on a confidence score learned during the training of the one or more trained ML models by inputting sample parameters of workflows into the one or more trained ML models and determining an accuracy of the predictions of the one or more trained ML models.

29. The computer-implemented method of claim 27, further comprising:
receiving workflows where a developer rejected a suggested next sequence of activities;
retraining the one or more trained ML models using the received workflows where the developer rejected the suggested next sequence of activities;
replacing the one or more trained ML models with the one or more retrained ML models; and
making the one or more retrained ML models available to the one or more RPA workflow designer applications after the retraining.

30. The computer-implemented method of claim 29, wherein the retraining occurs after a predetermined period of time has passed, after a predetermined amount of data has been collected since the training of the one or more trained ML models, after a predetermined number of developers have automatically completed workflows, after a predetermined number or percentage of developers have rejected suggestions from the one or more trained ML models, or any combination thereof.

31. The computer-implemented method of claim 27, wherein at least one of the one or more trained ML models is configured to:
   learn developer-specific style, logic, conventions, or any combination thereof, as a developer develops workflows over time; and
   suggest next sequences of activities based on the learned developer-specific style, logic, conventions, or any combination thereof, the next sequences of activities learned by retraining the one or more ML models using parameters from workflows that the developer completed, the completed workflow parameters used for retraining when a previous suggestion by the one or more ML models was declined by the developer.

32. The computer-implemented method of claim 27, wherein the local ML model and the global ML model utilize different suggestion confidence thresholds.

33. The computer-implemented method of claim 27, wherein the one or more trained ML models are trained using attended developer feedback, unattended developer feedback, or both.

* * * * *